US009765860B2

(12) United States Patent
Tange

(10) Patent No.: US 9,765,860 B2
(45) Date of Patent: Sep. 19, 2017

(54) CONTINUOUSLY VARIABLE TRANSMISSION MECHANISM

(71) Applicant: JATCO Ltd, Fuji-shi, Shizuoka (JP)

(72) Inventor: Hiroshi Tange, Fuji (JP)

(73) Assignee: JATCO Ltd, Fuji-Shi (JP)

( * ) Notice: Subject to any disclaimer, the term of this patent is extended or adjusted under 35 U.S.C. 154(b) by 1 day.

(21) Appl. No.: 14/897,114

(22) PCT Filed: May 28, 2014

(86) PCT No.: PCT/JP2014/064064
§ 371 (c)(1),
(2) Date: Dec. 9, 2015

(87) PCT Pub. No.: WO2014/199823
PCT Pub. Date: Dec. 18, 2014

(65) Prior Publication Data
US 2016/0138687 A1    May 19, 2016

(30) Foreign Application Priority Data

Jun. 10, 2013  (JP) ................................. 2013-122040
Jan. 21, 2014  (JP) ................................. 2014-008994

(51) Int. Cl.
| F16H 55/00 | (2006.01) |
| F16H 9/02 | (2006.01) |
| F16H 59/00 | (2006.01) |
| F16H 61/00 | (2006.01) |
| F16H 63/00 | (2006.01) |
| F16H 55/54 | (2006.01) |
| F16H 9/10 | (2006.01) |
| F16H 9/24 | (2006.01) |
| F16H 55/30 | (2006.01) |

(52) U.S. Cl.
CPC ................. *F16H 9/24* (2013.01); *F16H 9/10* (2013.01)

(58) Field of Classification Search
CPC ... F16H 9/24; F16H 55/54; F16H 9/10; F16H 37/0846; B62M 9/08
USPC .................................... 474/47, 49, 52, 53, 54
See application file for complete search history.

(56) References Cited

U.S. PATENT DOCUMENTS 3,913,410 A  * 10/1975 Ackerman ................ F16H 9/24
474/138
4,129,044 A  * 12/1978 Erickson .................. B62M 9/08
280/236

(Continued)

FOREIGN PATENT DOCUMENTS

| JP | 2002-250420 A | 9/2002 |
| JP | 2004-052930 A | 2/2004 |

(Continued)

*Primary Examiner* — Henry Liu
(74) *Attorney, Agent, or Firm* — Foley & Lardner LLP

(57) ABSTRACT

The present invention has a mechanical rotation drive mechanism (50) that drives rotation of at least one rotation pinion sprocket (22; 23) on its axis from among a plurality of pinion sprockets (20). The mechanical rotation drive mechanism (50) drives the rotation of at least one rotation pinion sprocket (22; 23) on its axis in concert with a sprocket movement mechanism (40A) so as to eliminate a phase shift, associated with a radial direction movement of the plurality of pinion sprockets (20) by the sprocket movement mechanism (40A), of the plurality of pinion sprockets (20) with respect to a chain (6).

11 Claims, 7 Drawing Sheets

(56) References Cited

U.S. PATENT DOCUMENTS

| | | | | |
|---|---|---|---|---|
| 4,167,124 | A * | 9/1979 | Zvetkov | F16H 9/10 474/53 |
| 4,740,190 | A * | 4/1988 | Pike | B62M 9/08 474/49 |
| 5,476,422 | A * | 12/1995 | Schendel | F16H 55/54 474/49 |
| 5,984,814 | A * | 11/1999 | Davenport | B62M 9/08 474/50 |
| 6,183,385 | B1 * | 2/2001 | Bakulich, Jr. | F16H 9/10 474/49 |
| 6,332,852 | B1 * | 12/2001 | Allard | B62M 9/08 474/49 |
| 7,713,154 | B2 * | 5/2010 | Hawthorn | F16G 13/06 474/47 |
| 9,028,350 | B2 * | 5/2015 | Cho | F16H 55/54 474/47 |
| 2002/0042314 | A1 * | 4/2002 | Mimura | F16H 55/54 474/56 |
| 2005/0148416 | A1 * | 7/2005 | Naude | B62M 9/08 474/49 |
| 2005/0227797 | A1 * | 10/2005 | Jeng | F16H 55/54 474/47 |
| 2005/0288137 | A1 * | 12/2005 | Vargas | F16H 55/54 474/47 |
| 2008/0214345 | A1 * | 9/2008 | Khan | F16G 13/06 474/231 |
| 2011/0045928 | A1 * | 2/2011 | Wong | F16H 9/24 474/47 |
| 2011/0306457 | A1 * | 12/2011 | Lee | F16H 9/24 475/213 |
| 2012/0238384 | A1 * | 9/2012 | Lee | F16H 9/10 474/25 |

FOREIGN PATENT DOCUMENTS

| | | |
|---|---|---|
| WO | WO-98/11364 A1 | 3/1998 |
| WO | WO-2012/011739 A2 | 1/2012 |

* cited by examiner

CONTINUOUSLY VARIABLE TRANSMISSION MECHANISM

The present invention relates to a continuously variable transmission mechanism that transmits power by a plurality of pinion sprockets, each of which is supported movably in a radial direction with equidistance of each pinion sprocket from a rotation shaft maintained and each of which revolves about the rotation shaft so as to rotate integrally with each other, and a chain wound around the pinion sprockets.

BACKGROUND ART

In recent years, as a transmission for a vehicle, a belt type continuously variable transmission, in which a drive belt is wound around a primary pulley and a secondary pulley and power is transmitted using a frictional force generated between each pulley and the drive belt by thrust applied to a movable sheave of each pulley, has been put to practical use.

In a case of the continuously variable transmission, it is required to secure the frictional force by increasing the thrust when transmitting great power. At this time, load of a driving source (an engine or an electric motor) for driving a thrust-generating oil pump is increased, then this leads to increase in a fuel consumption amount or a power consumption amount. Further, durability of each pulley and the drive belt etc. might be deteriorated.

Therefore, there has been developed a continuously variable transmission mechanism that transmits power by a plurality of pinion sprockets and a chain wound around the pinion sprockets without using the thrust and the frictional force.

Such a continuously variable transmission mechanism is provided, at an input side and an output side thereof, with an apparent large sprocket (here, called a composite sprocket) formed by the plurality of pinion sprockets, each of which is supported movably in a radial direction with equidistance of each pinion sprocket from a rotation shaft maintained and each of which revolves about the rotation shaft so as to rotate integrally with each other and also each of which is arranged at an apex of a polygon. Then, by the chain wound around these composite sprockets, the power is transmitted. In such a configuration, the pinion sprockets radially move in synchronization with each other while maintaining their equidistance from the rotation shaft, thereby changing a size of the polygon as a similar shape, then a transmission ratio is changed.

At a time of the transmission ratio change (or speed change) in such continuously variable transmission mechanism, excess and deficiency of a chain length occur between the pinion sprockets due to the fact that a distance between the pinion sprockets changes, and thus slack and tension of the chain occur. Unless these excess and deficiency of the chain length are overcome, it is not possible to radially move each pinion sprocket and to change the transmission ratio.

For this problem, there has been developed technique that is disclosed in the following Patent Document 1 and Patent Document 2.

Patent Document 1 discloses that two disks (two spindles) are arranged parallel to each other at one side of a plurality of pinion sprockets, radial slots are formed on each disk, the radial slot (hereinafter, called a first radial slot) on one disk and the radial slot (hereinafter, called a second radial slot) on the other disk are arranged so as to intersect with each other, and a shaft of each sprocket is supported in a position where the first and second radial slots intersect. When a relative angle (a relative phase) between one disk and the other disk is changed, since an intersection position of the first and second radial slots moves in a radial direction, the shaft of each pinion sprocket which is supported in this intersection position moves in the radial direction by and according to the relative rotation of the both disks.

Patent Document 1 also discloses that the pinion sprocket has a predetermined mechanism in which when a force by torque transmission through a chain acts on the pinion sprocket, the chain is engaged with the pinion sprocket, then the pinion sprocket is allowed to rotate integrally with an axis of the continuously variable transmission mechanism, and in which when the force by the torque transmission through the chain does not act on the pinion sprocket and the force is released, the chain is disengaged from the pinion sprocket, then the pinion sprocket is allowed to rotate freely with respect to the axis of the continuously variable transmission mechanism. When the predetermined mechanism is in an engagement state, the power transmission becomes possible, and when the predetermined mechanism is in a disengagement state, a radial direction movement of each pinion sprocket becomes possible. Further, a chain tensioner giving a tension to the chain to operate the predetermined mechanism is provided.

Patent Document 2 discloses a power distribution mechanism in which a female thread is provided at a slide frame to which a pinion sprocket is fixed and a male screw mating with this female thread is rotated. By simultaneously rotating each of the same number of male screw by the power distribution mechanism, each sprocket is moved in a radial direction.

Patent Document 2 also discloses that each pinion sprocket is provided with a reverse rotation preventing unit that permits rotation in one direction and prohibits rotation in the other direction and a clutch that switches between fixation and release of the rotation. By the reverse rotation preventing unit, it is possible to adjust the excess and deficiency of the chain length when changing a position of each pinion sprocket in the radial direction. Further, by fixing the rotation of each pinion sprocket by the clutch, engine brake becomes effective.

According to the predetermined mechanism of Patent Document 1, since the power transmission and the transmission ratio change (the speed change) are performed exclusively, it is difficult to change the transmission ratio at a time of the power transmission, and it is difficult to transmit the power at a time of the change of the transmission ratio. In addition, as a problem, even at a constant transmission ratio, the engine brake is ineffective. Moreover, since the chain tensioner is provided, a power transmission efficiency might be decreased due to friction generated between the chain and the chain tensioner.

On the other hand, according to the reverse rotation preventing unit of Patent Document 2, when the rotation of each pinion sprocket is fixed by the clutch, it is impossible to change the transmission ratio. Further, when the rotation of each pinion sprocket is not fixed by the clutch, although the transmission ratio can be changed, there is a possibility that the power cannot be transmitted because of free rotation of each pinion sprocket. Furthermore, as a problem, the engine brake becomes ineffective.

CITATION LIST

Patent Document

Patent Document 1: U.S. Pat. No. 7,713,154
Patent Document 2: Japanese Unexamined Patent Application Publication No. 2002-250420

SUMMARY OF THE INVENTION

The present invention was made in view of the above problem. An object of the present invention is to provide a continuously variable transmission mechanism that is capable of change the transmission ratio while transmitting the power.

The object of the present invention is not limited to the above, but includes effects brought by each configuration shown in the following "Embodiments for carrying out the Invention" which cannot be brought by prior arts.

In order to achieve the above object, a continuously variable transmission mechanism that changes a transmission ratio according to the present invention, comprises: a set of two composite sprockets each having: a rotation shaft that inputs or outputs power; a plurality of pinion sprockets, each of which is supported movably in a radial direction with respect to the rotation shaft; and a sprocket movement mechanism that moves the plurality of pinion sprockets in the radial direction in synchronization with each other while maintaining equidistance of each of the pinion sprockets from a shaft center of the rotation shaft; a chain wound around the set of two composite sprockets, the transmission ratio is changed by changing a circumcircle radius that is a radius of a circle that encircles all of the plurality of pinion sprockets and circumscribes all of the plurality of pinion sprockets; and also comprises: a mechanical rotation drive mechanism mechanically driving rotation of at least one rotation pinion sprocket on its axis from among the plurality of pinion sprockets in concert with the sprocket movement mechanism so as to eliminate a phase shift, associated with the radial direction movement of the plurality of pinion sprockets by the sprocket movement mechanism, of the plurality of pinion sprockets with respect to the chain.

As one configuration, it is preferable that the mechanical rotation drive mechanism have a rack arranged along a radial direction of a rotation stationary disk that rotates integrally with the rotation shaft; and a pinion fixedly connected to a supporting shaft of the rotation pinion sprocket and meshing with the rack, and the mechanical rotation drive mechanism rotate the rotation pinion sprocket on its axis by rotation of the pinion meshing with the rack according to the radial direction movement of the rotation pinion sprocket.

As another configuration, it is preferable that the sprocket movement mechanism have a sprocket supporting shaft that supports the pinion sprocket; a stationary disk that is provided with a sprocket stationary radial slot, in which the sprocket supporting shaft is fitted, and rotates integrally with the rotation shaft; a movable disk that is disposed concentrically with the stationary disk, can rotate relatively to the stationary disk and is provided with a sprocket movable radial slot that intersects the sprocket stationary radial slot, the sprocket supporting shaft being positioned in an intersection position between the sprocket movable radial slot and the sprocket stationary radial slot; and a drive mechanism that drives relative rotation of the movable disk with respect to the stationary disk and moves the intersection position in the radial direction, the mechanical rotation drive mechanism have a first rotation pin that is provided eccentrically to the sprocket supporting shaft; and a first rotation disk that is disposed concentrically with the stationary disk, rotates integrally with the rotation shaft and is provided with a first rotation radial slot in which the first rotation pin is fitted, and the first rotation radial slot guide the first rotation pin in concert with a radial direction movement of the sprocket supporting shaft, and rotate the rotation pinion sprocket on its axis.

According to the continuously variable transmission mechanism of the present invention, the mechanical rotation drive mechanism mechanically drives the rotation of any of the pinion sprockets on its axis in concert with the sprocket movement mechanism so as to eliminate the phase shift, associated with the radial direction movement of the plurality of pinion sprockets by the sprocket movement mechanism, of the plurality of pinion sprockets with respect to the chain. Therefore, when the plurality of pinion sprockets move in the radial direction, i.e. when the transmission ratio is changed, the chain length between the plurality of pinion sprockets is appropriately adjusted. Further, since power is transmitted without interruption when driving the pinion sprocket, it is possible to change the transmission ratio while transmitting the power.

BRIEF DESCRIPTION OF DRAWINGS

FIG. 3A shows a case where the circumcircle radius is a minimum diameter. FIG. 3C shows a case where the circumcircle radius is a maximum diameter.

In FIG. 7, three pinion sprockets are shown, which are the same pinion sprocket, along a time series. The pinion sprocket changes from lower-left toward upper-right along the time series.

EMBODIMENTS FOR CARRYING OUT THE INVENTION

In the following description, embodiments of a continuously variable transmission mechanism of the present invention will be explained with reference to the drawings. The continuously variable transmission mechanism of the embodiments is favorable for a transmission for a vehicle. Here, the embodiments will be explained with a side that is close to a shaft center (an axis) of a rotation shaft (a rotation axis) of the continuously variable transmission mechanism being an inner side, and with an opposite side being an outer side.

1. First Embodiment

In the following description, a continuously variable transmission mechanism of a first embodiment will be explained.

[1-1. Configuration of Continuously Variable Transmission Mechanism]

Figure 1:
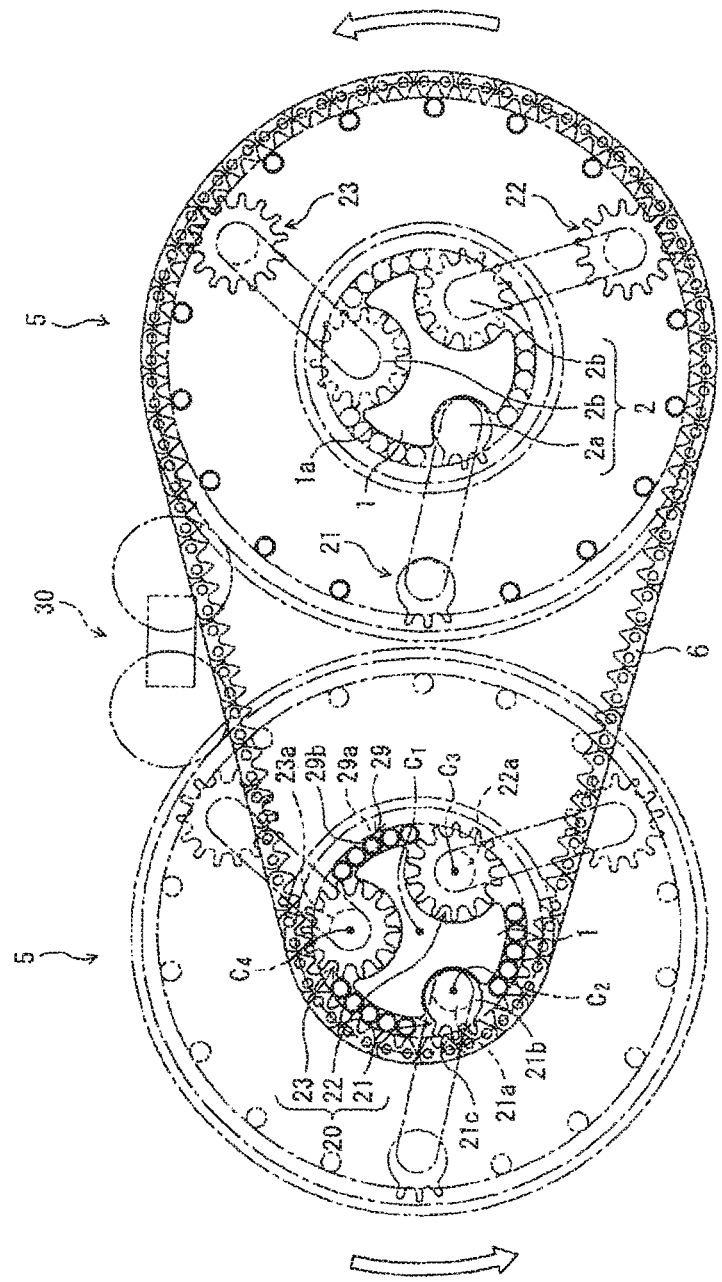
FIG. 1 is a front view schematically showing a main part of a continuously variable transmission mechanism according to a first embodiment of the present invention.

As shown in FIG. 1, the continuously variable transmission mechanism has a set of two composite sprockets 5, 5 and a chain 6 wound around these composite sprockets 5, 5. The composite sprocket 5 means an apparent large sprocket formed by a plurality of pinion sprockets 20 and a plurality of guide rods 29 (both described in detail later), each of which is arranged at an apex of a polygon (here, an octadodecagon).

One of the set of two composite sprockets 5, 5 is a composite sprocket 5 (shown on a left side in FIG. 1) arranged concentrically with an input side rotation shaft 1 (an input shaft or an input axis), and the other is a composite sprocket 5 (shown on a right side in FIG. 1) arranged concentrically with an output side rotation shaft 1 (an output shaft or an output axis). Since these composite sprockets 5, 5 have the same configuration, the input side composite sprocket 5 is focused here, and its configuration will be explained in the following description.

The composite sprocket 5 has the rotation shaft (the rotation axis) 1, the plurality of pinion sprockets (here, three pinion sprockets) 20, each of which is supported movably in a radial direction with respect to the rotation shaft 1, and the plurality of guide rods (here, fifteen guide rods) (first guide rods) 29. The three pinion sprockets 20 are arranged at regular intervals along a circumferential direction on a circumference of a circle whose center is a shaft center C1 of the rotation shaft 1. Between adjacent pinion sprockets 20, five guide rods 29 are disposed.

The composite sprocket 5 has a sprocket movement mechanism 40A that moves the plurality of pinion sprockets 20, a mechanical rotation drive mechanism 50 that drives rotation of rotation pinion sprockets 22, 23 included in the pinion sprockets 20 in concert with the sprocket movement mechanism 40A and a rod movement mechanism 40B that moves the plurality of guide rods 29 (see FIGS. 2 to 5), although these mechanisms are not shown in FIG. 1. Detailed explanation of these mechanisms will be described later.

This continuously variable transmission mechanism is a mechanism that changes a transmission ratio by changing (widening or reducing) an outside diameter of the apparent large sprocket formed by the pinion sprockets 20 and the guide rods 29, each of which is arranged at the apex of the polygon (here, the octadodecagon), i.e. an outside diameter of the composite sprocket 5.

The outside diameter of the composite sprocket 5 corresponds to a radius (hereinafter, called "circumcircle radius") of a circle (a circumcircle) that encircles all of the plurality of pinion sprockets 20 and circumscribes all of the plurality of pinion sprockets 20. Or, since the chain 6 is wound around the composite sprocket 5, the outside diameter of the composite sprocket 5 also corresponds to a contact radius of the plurality of pinion sprockets 20 and the chain 6. Therefore, when the circumcircle radius or the contact radius is a minimum diameter, the outside diameter of the composite sprocket 5 is a minimum diameter. When the circumcircle radius or the contact radius is a maximum diameter, the outside diameter of the composite sprocket 5 is a maximum diameter.

Thus, it can be said that the continuously variable transmission mechanism is a mechanism that changes the transmission ratio by change of the circumcircle radius.

Here, FIG. 1 shows a case where the circumcircle radius on the input side is the minimum diameter, and the circumcircle radius on the output side is the maximum diameter.

In the following description, the configuration of the continuously variable transmission mechanism will be explained in order of the composite sprocket 5 and the chain 6 wound around the composite sprocket 5.

[1-1-1. Composite Sprocket]

Configuration of the composite sprocket 5 will be explained in order of the pinion sprocket 20, the guide rod 29, the sprocket movement mechanism 40A, the rod movement mechanism 40B, the mechanical rotation drive mechanism 50 and the rotation shaft.

[1-1-1-1. Pinion Sprocket]

The three pinion sprockets 20 are configured as a gear or toothed wheel that transmits power by engaging with the chain 5, and revolve about the shaft center C1 of the rotation shaft 1. Here, "revolve (revolution)" means that each pinion sprocket 20 revolves with the shaft center C1 of the rotation shaft 1 being a center. When the rotation shaft 1 rotates, each pinion sprocket 20 revolves in concert with this rotation of the rotation shaft 1. That is, the number of rotation (a rotation speed) of the rotation shaft 1 and the number of revolution (a revolution speed) of the pinion sprocket 20 are equal to each other. Here, in FIG. 1, a revolution direction of a counterclockwise direction is shown by an open arrow.

The pinion sprockets 20 are formed from one pinion sprocket (hereinafter, called a stationary pinion sprocket) 21 that does not rotate on its axis and the two rotation pinion sprockets 22 and 23 that are arranged at an advanced side and a retarded side with respect to the stationary pinion sprocket 21 in a direction of a rotation phase of the revolution and can rotate on their axes. In the following explanation, to make a distinction, a pinion sprocket (an advanced side rotation pinion sprocket) arranged at the advanced side with respect to the stationary pinion sprocket 21 is called a first rotation pinion sprocket 22, and a pinion sprocket (a retarded side rotation pinion sprocket) arranged at the retarded side with respect to the stationary pinion sprocket 21 is called a second rotation pinion sprocket 23.

The pinion sprockets 21, 22 and 23 are respectively fixed to supporting shafts 21a, 22a and 23a that are provided at centers of the pinion sprockets 21, 22 and 23. "rotate (rotation)" here means that the rotation pinion sprockets 22 and 23 rotate on shaft centers C3 and C4 of their supporting shafts 22a and 23a. Here, shaft centers C2, C3 and C4 of the supporting shafts 21a, 22a and 23a and the shaft center C1 of the rotation shaft 1 are parallel to each other.

The stationary pinion sprocket 21 has a body 21b and teeth 21c formed partly at an outer circumferential portion of the body 21b. That is, the stationary pinion sprocket 21 is provided with the protruding teeth 21c at a part of an outer circumferential area of the stationary pinion sprocket 21 which can be engaged with the chain 6. In other words, an outer circumferential area of the stationary pinion sprocket 21 which is not engaged with the chain 6 is provided with no tooth.

Here, in FIG. 1, although apart, where no tooth is formed, of the stationary pinion sprocket 21 has an arc shape viewed from a front, this shape is not limited to the arc shape. A variety of shapes such as rectangular and triangular shapes could be employed.

Each of the rotation pinion sprockets 22 and 23 is provided, at an entire circumference of a circumferential portion thereof, with protruding teeth. As a matter of course, a shape and a size of the tooth provided at each of the pinion sprockets 21, 22 and 23 are the same standardized shape and size.

The first rotation pinion sprocket 22 rotates on its axis in a clockwise direction when the circumcircle radius is widened, while the first rotation pinion sprocket 22 rotates on its axis in a counterclockwise direction when the circumcircle radius is reduced, although a detailed explanation will be made later. On the other hand, the second rotation pinion sprocket 23 rotates on its axis in the counterclockwise direction when the circumcircle radius is widened, while the second rotation pinion sprocket 23 rotates on its axis in the clockwise direction when the circumcircle radius is reduced.

Figure 2:
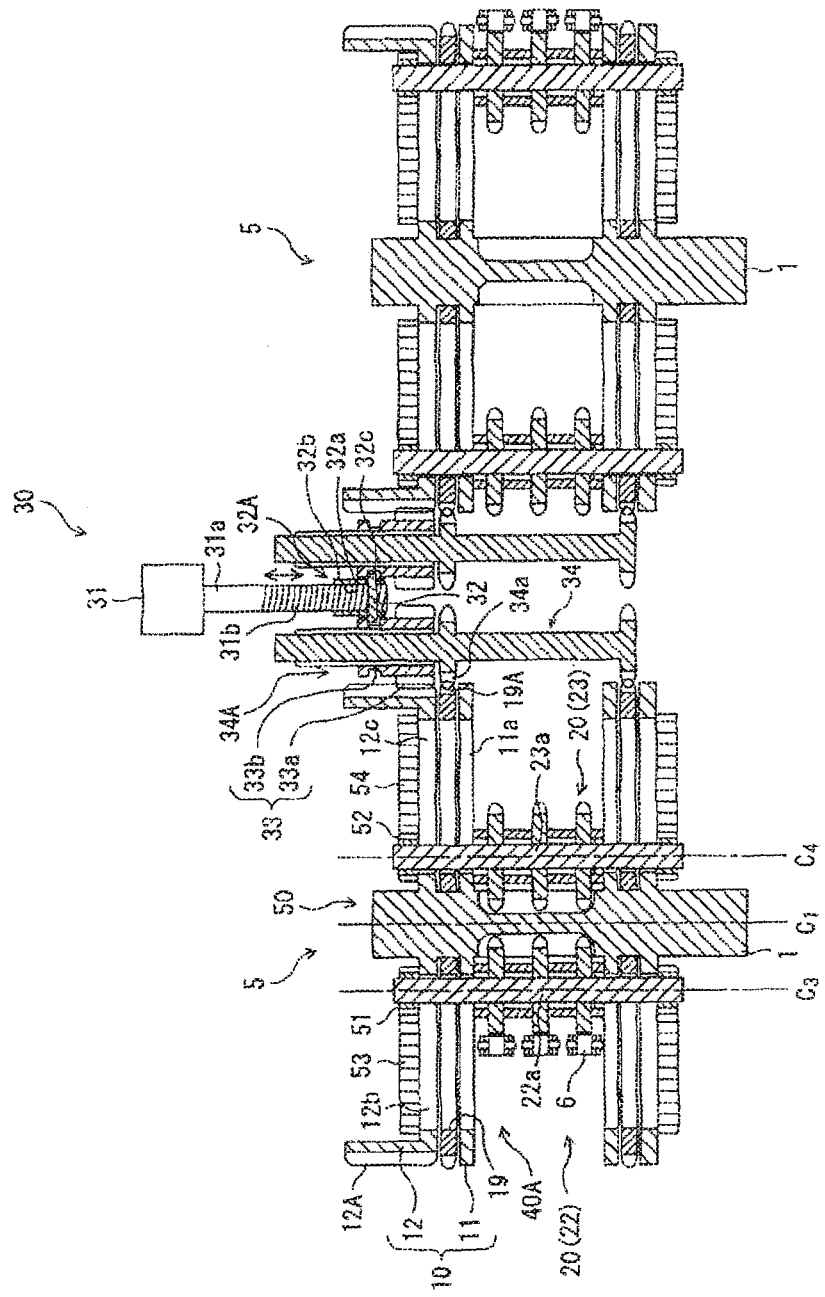
FIG. 2 is a sectional view schematically showing the main part of the continuously variable transmission mechanism according to the first embodiment of the present invention.

As shown in FIG. 2, the rotation pinion sprockets 22 and 23 each have three row gears in an axial direction. The stationary pinion sprocket 21 has also three row gears in an axial direction, although these are not shown in the drawings. Three chains 6 are wound around the pinion sprockets 21, 22 and 23 with one chain 6 engaging with the gear in each row. Each of the pinion sprockets 21, 22 and 23 has the three row gears in the axial direction as explained above, and the three row gears of each of the pinion sprockets 20 are provided with spaces given through spacers.

Here, the number of rows of the gear of the pinion sprockets 21, 22 and 23 could be two or four or more, or might be one, according to magnitude of transmission torque of the continuously variable transmission mechanism.

In FIG. 2, for easy understanding, the configuration is schematically shown, and the first rotation pinion sprocket 22 and the second rotation pinion sprocket 23 and an after-mentioned relative rotation drive mechanism 30 are shown on a same cross section.

[1-1-1-2. Guide Rod]

As shown in FIG. 1, the plurality of guide rods 29 are elements that guide the chain 6 so as to make variation in a distance between the chain 6 and the shaft center C1 of the rotation shaft 1 smaller, i.e. so as to bring an orbit or a path of the chain 6 around the rotation shaft 1 closer to as circular a path as possible. The guide rod 29 guides the path of the chain 6 that abuts on an outer side circumferential surface of this guide rod 29. Since the pinion sprockets 21, 22 and 23 and each guide rod 29 forma shape of the polygon (a substantially regular polygon), the chain 6 rolls along the shape of the polygon while abutting on or contacting the pinion sprockets 21, 22 and 23 and each guide rod 29 and being guided by the pinion sprockets 21, 22 and 23 and each guide rod 29, each of which is located inside the chain 6.

Each guide rod 29 is formed by fitting a cylindrical guide member 29b onto an outer circumference of a rod supporting shaft 29a (in FIG. 1, only one supporting shaft is shown by a broken line). The guide rod 29 is supported by the rod supporting shaft 29a, and guides the chain 6 by an outer circumferential surface of the guide member 29b.

The number of the guide rod 29 is not limited to fifteen, but it could be larger than or smaller than fifteen. In this case, it is desirable that the number of the guide rod 29 should be multiples of the number of the mutual pinion sprockets 20 (here, three). Further, the more the guide rod 29 is provided, the more the composite sprocket 5 is brought close to a perfect circle, then this makes it possible for the variation in the distance between the chain 6 and the shaft center C1 of the rotation shaft 1 to be smaller. However, this causes complexity of the configuration and leads to increase in manufacturing cost and increase in weight due to increase in parts count. Thus, it is preferable to set the number of the guide rod 29 with consideration given to these defects. Further, in order to simplify the configuration, it might be possible to omit the guide rod 29.

[1-1-1-3. Sprocket Movement Mechanism, Rod Movement Mechanism and Mechanical Rotation Drive Mechanism]

Next, the sprocket movement mechanism 40A, the rod movement mechanism 40B and the mechanical rotation drive mechanism 50 will each be explained.

The sprocket movement mechanism 40A moves the plurality of pinion sprockets 20 as an object of the movement. The rod movement mechanism 40B moves the plurality of guide rods 29 as an object of the movement.

These movement mechanisms 40A and 40B are mechanisms that move the respective objects of the movement (i.e. the plurality of pinion sprockets 20, the plurality of guide rods 29) in the radial direction in synchronization with each other while maintaining equidistance of each of the pinion sprockets 20 and the guide rods 29 from the shaft center C1 of the rotation shaft 1.

The mechanical rotation drive mechanism 50 is a mechanism that drives rotation of the rotation pinion sprockets 22, 23 in concert with the sprocket movement mechanism 40A so as to eliminate a phase shift of the plurality of pinion sprockets 20 with respect to the chain 6, by or associated with the radial direction movement of the plurality of pinion sprockets 20 by the sprocket movement mechanism 40A.

[1-1-1-3-1. Prerequisite Configuration]

First, each prerequisite configuration of the mechanisms 40A, 40B and 50 will be explained with reference to FIG. 2. As the prerequisite configuration, a stationary disk group 10 that rotates integrally with the rotation shaft 1, a movable disk 19 that is disposed concentrically with the stationary disk group 10 and can rotate relatively to the stationary disk group 10 and the relative rotation drive mechanism 30 that drives the relative rotation of the movable disk 19 with respect to the stationary disk group 10 will each be explained here.

Each of the stationary disk group 10 and the movable disk 19 is provided at both sides (one side and the other side in a direction along the shaft center C1 of the rotation shaft 1) of the plurality of pinion sprockets 20. Thus, the stationary disk group 10 and the movable disk 19 at the one side (an upper side in FIG. 2) are focused here, and their configurations will be explained.

[1-1-1-3-1-1. Stationary Disk]

The stationary disk group 10 has, in order from a side of the plurality of pinion sprockets 20, a first stationary disk (a radial direction movement stationary disk) 11 and a second stationary disk (a rotation stationary disk) 12. Each of these stationary disks 11 and 12 is formed integrally with the rotation shaft 1, or each of these stationary disks 11 and 12 is connected to the rotation shaft 1 so as to rotate integrally with the rotation shaft 1. Here, FIG. 2 shows, as an example, a case where the first stationary disk 11, after-mentioned movable disk 19 and the second stationary disk 12 are arranged in order from the side of the plurality of pinion sprockets 20.

Figure 3A:
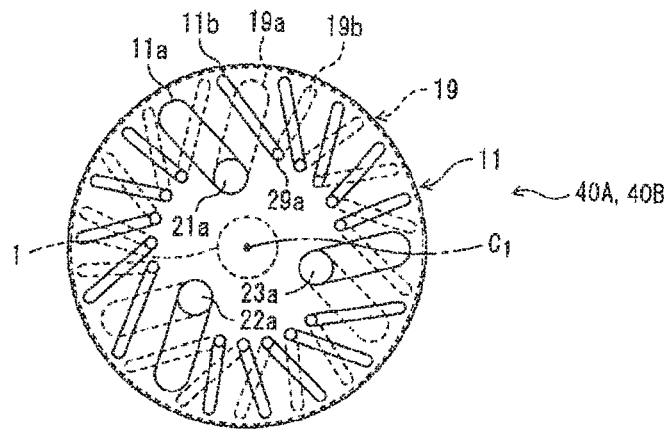
FIGS. 3A to 3C are drawings showing each supporting shaft (axis or rod) of a first stationary disk (a stationary disk), a movable disk, a pinion sprocket and a guide rod that are moved by the stationary and movable disks, of the continuously variable transmission mechanism according to the first embodiment, and explaining a sprocket movement mechanism and a rod movement mechanism. A circumcircle radius becomes greater in order of FIG. 3A, FIG. 3B and FIG. 3C.
Figure 3B:
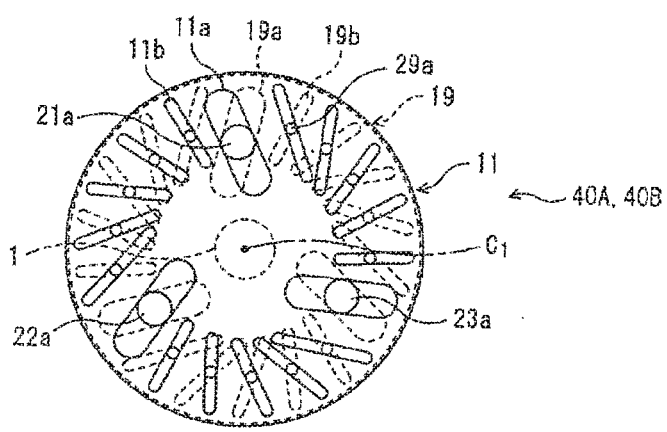
Figure 3C:
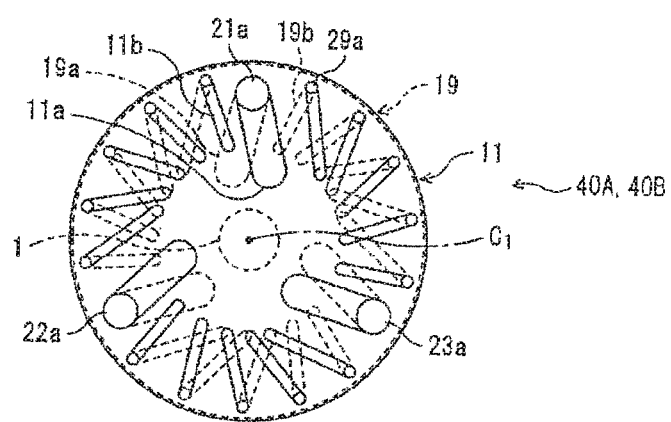

As shown in FIGS. 3A to 3C, two types of radial slots (or grooves) of a sprocket stationary radial slot 11a and a rod stationary radial slot 11b (only each one slot is denoted by a reference sign 11a or 11b) are formed at the first stationary disk 11.

The sprocket stationary radial slot 11a has slots corresponding to the number of the pinion sprockets 20 (here, three). The rod stationary radial slot 11b has slots corresponding to the number of the guide rods 29 (here, fifteen).

Each of the supporting shafts 21a, 22a and 23a of the pinion sprockets 21, 22 and 23 are inserted or fitted in the sprocket stationary radial slot 11a. The rod supporting shaft 29a (only one supporting shaft is denoted by a reference sign 29a) of each guide rod 29 is inserted or fitted in the rod stationary radial slot 11b.

Figure 4:
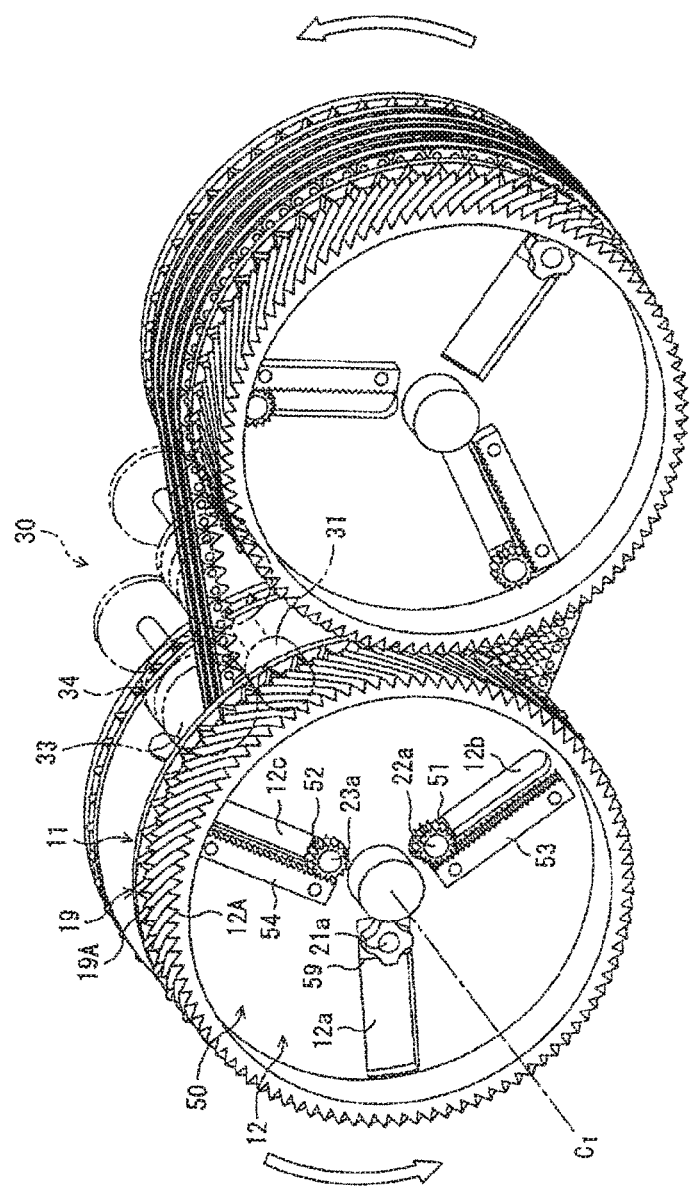
FIG. 4 is a perspective view schematically showing the main part of the continuously variable transmission mechanism according to the first embodiment of the present invention.

As shown in FIGS. 2 and 4, guide slots (or grooves) 12a, 12b and 12c corresponding to the pinion sprockets 21, 22 and 23 are formed at the second stationary disk 12. More specifically, a first guide slot (a stationary pinion sprocket guide slot) 12a that guides the radial direction movement of the stationary pinion sprocket 21, a second guide slot 12b that guides the radial direction movement of the first rotation pinion sprocket 22 and a third guide slot 12c that guides the radial direction movement of the second rotation pinion sprocket 23 are formed. These guide slots 12a, 12b and 12c are formed along the respective radial direction movement paths of the corresponding pinion sprockets 21, 22 and 23.

Here, in FIG. 4, the revolution direction of a counterclockwise direction is shown by an open arrow.

The second stationary disk 12 is provided, at an outer circumferential portion thereof, with a helical gear 12A. The outer circumferential portion of the second stationary disk 12, where this helical gear 12A is formed, extends or protrudes so as to have a predetermined length in a direction along the shaft center C1, and the helical gear 12A is provided throughout the predetermined length.

Here, "predetermined length" here is a length corresponding to a movement distance of an after-mentioned input member 33 of the relative rotation drive mechanism 30 which corresponds to a phase difference between the second stationary disk 12 and the movable disk 19.

[1-1-1-3-1-2. Movable Disk]

As shown in FIGS. 3A to 3C, two types of movable radial slots (or grooves) of a sprocket movable radial slot 19a and a rod movable radial slot 19b (shown by a broken line, only each one slot is denoted by a reference sign 19a or 19b) are formed at the movable disk 19 (shown by a broken line). Here, although an outside shape of the movable disk 19 is a circular shape and matches and overlaps an outside shape of the circular first stationary disk 11, for the sake of convenience, the circular outside shape of the movable disk 19 is shown with its size reduced in FIGS. 3A to 3C.

The sprocket movable radial slot 19a intersects the sprocket stationary radial slot 11a, and each of the supporting shafts 21a, 22a and 23a is positioned in this intersection position (or intersection point). Likewise, the rod movable radial slot 19b intersects the rod stationary radial slot 11b, and each rod supporting shaft 29a is positioned in this intersection position (or intersection point).

As shown in FIGS. 2 and 4, the movable disk 19 is provided, at an entire circumference of an outer circumferential portion thereof, with teeth (hereinafter, called outer circumferential teeth) 19A.

[1-1-1-3-1-3. Relative Rotation Drive Mechanism]

The relative rotation drive mechanism 30 is a mechanism that drives the relative rotation of the movable disk 19 with respect to the stationary disk group 10. The relative rotation drive mechanism 30 drives the relative rotation of the movable disk 19 with respect to the stationary disk group 10 by rotating an output member 34 having rotation drive teeth 34a that are engaged with the outer circumferential teeth 19A formed at the outer circumference of the movable disk 19.

This relative rotation drive mechanism 30 has a motor 31, a movement conversion mechanism 32A that converts rotational motion of an output shaft 31a of the motor 31 into linear motion, a fork 32 that is driven and reciprocates in an axial direction by the linear motion converted by the movement conversion mechanism 32A, the input member 33 that is driven and slides in the axial direction by the fork 32, an interlocking rotation mechanism 34A that interlocks and rotates the input member 33 by the slide in the axial direction of the input member 33, and the output member 34 that rotates integrally with the input member 33.

As the motor 31, for instance, a stepping motor can be used.

The input member 33 is set so as to be able to move with respect to the output member 34 in the axial direction and also to rotate integrally with the output member 34, for instance, by spline engagement.

The input member 33 has a helical gear 33a that is engaged all the time with the helical gear 12A provided at the outer circumferential portion of the second stationary disk 12 and a fork groove 33b that slides by sandwiching the fork 32. The output member 34 has output teeth 34a that is engaged all the time with the outer circumferential teeth 19A of the movable disk 19.

The movement conversion mechanism 32A is formed from a male screw portion 31b formed at the output shaft 31a of the motor 31, a supporting body 32b having a female thread portion 32a into which the male screw portion 31b is screwed and the fork 32 connected to the supporting body 32b, and a fork outer peripheral portion 32c restraining rotation of the fork 32 by engaging with the fork groove 33b formed at an outer circumference of the input member 33. When the output shaft 31a rotates, the fork 32 whose rotation is restrained moves by the screw motion of the male screw portion 31b and the female thread portion 32a in the axial direction with respect to the output shaft 31a, and drives the input member 33 in the axial direction.

The interlocking rotation mechanism 34A has the helical gear 12A provided at the outer circumferential portion of the second stationary disk 12, the helical gear 33a formed at the outer circumference of the input member 33 and engaged with the helical gear 12A and an axial direction movement limiting member (not shown) that prohibits movement of the output member 34 in the axial direction. By or according to the axial direction movement of the input member 33, the second stationary disk 12 drives the rotation of the input member 33 through the engagement of the helical gears 12A and the helical gear 33a.

According to this relative rotation drive mechanism 30, when the fork 32 slides by being driven by the motor 31, a rotation phase of the movable disk 19 is changed with respect to each stationary disk group 10. In this manner, a rotation phase difference between the stationary disk group 10 and the movable disk 19 is adjusted according to a slide distance of the fork 32.

[1-1-1-3-2. Sprocket Movement Mechanism and Rod Movement Mechanism]

Next, the sprocket movement mechanism 40A and the rod movement mechanism 40B will be explained with reference to FIGS. 2 and 3A to 3C.

The sprocket movement mechanism 40A is formed from the supporting shafts 21a, 22a and 23a of the pinion sprockets 21, 22 and 23, the first stationary disk 11 where the sprocket stationary radial slot 11a is formed, the movable disk 19 where the sprocket movable radial slot 19a is formed and the relative rotation drive mechanism 30.

The rod movement mechanism 40B is formed from the rod supporting shaft 29a, the first stationary disk 11 where the rod stationary radial slot 11b is formed, the movable disk 19 where the rod movable radial slot 19b is formed and the relative rotation drive mechanism 30.

As mentioned above, the configurations of the movement mechanisms 40A and 40B are different in only the supporting shaft that is the object of the movement, and other configurations are the same.

Next, movement by the movement mechanisms 40A and 40B will be explained with reference to FIGS. 3A to 3C.

FIG. 3A shows a case where the supporting shafts 21a, 22a and 23a in the radial slots 11a and 19a and the rod supporting shaft 29a in the radial slots 11b and 19b are positioned in a closest position from the shaft center C1 of the rotation shaft 1. When the rotation phase of the movable disk 19 is changed with respect to the first stationary disk 11 by the relative rotation drive mechanism 30 (see FIG. 2) from a state of FIG. 3A, in order of FIG. 3B, FIG. 3C, the intersection point of the sprocket stationary radial slot 11a and the sprocket movable radial slot 19a and the intersection position of the rod stationary radial slot 11b and the rod movable radial slot 19b move away from the shaft center C1 of the rotation shaft 1. That is, the pinion sprockets 20 and the guide rod 29 whose supporting shafts 21a, 22a, 23a and 29a are supported in these intersection positions move in the radial direction in synchronization with each other while maintaining the equidistance of each of the pinion sprockets 20 and the guide rods 29 from the shaft center C1 of the rotation shaft 1.

On the other hand, when a direction of the rotation phase of the movable disk 19 is changed, which is opposite to the above direction of the rotation phase of the movable disk 19, by the relative rotation drive mechanism 30, the pinion sprockets 20 and the guide rod 29 move closer to the shaft center C1 of the rotation shaft 1.

Here, when the input side movement mechanisms 40A and 40B widen the circumcircle radius of the input side, the output side movement mechanisms 40A and 40B reduce the circumcircle radius of the output side so that slack and tension of the chain 6 do not occur.

When the pinion sprockets 20 move by the sprocket movement mechanism 40A, since mutual distances between the pinion sprockets 20 are changed, the phase shift of the pinion sprockets 20 with respect to the chain 6 occurs. Thus, in order to eliminate the phase shift, the mechanical rotation drive mechanism 50 is equipped.

[1-1-1-3-3. Mechanical Rotation Drive Mechanism]

Next, the mechanical rotation drive mechanism 50 will be explained with reference to FIGS. 2 and 4. Since the mechanical rotation drive mechanism 50 is set symmetrically with respect to the pinion sprockets 20, the mechanical rotation drive mechanism 50 at one side (an upper side in FIG. 2) is focused here, and its configuration will be explained.

As mentioned above, the mechanical rotation drive mechanism 50 is the mechanism that mechanically drives the rotation of the rotation pinion sprockets 22, 23 in concert with the sprocket movement mechanism 40A so as to eliminate the phase shift between the pinion sprockets 20 with respect to the chain 6 by rotating the rotation pinion sprockets 22, 23.

Meanwhile, the mechanical rotation drive mechanism 50 is a mechanism that does not allow rotation of the stationary pinion sprocket 21 on its axis during the radial direction movement of the stationary pinion sprocket 21.

First, a configuration of the mechanical rotation drive mechanism 50, which does not allow the rotation of the stationary pinion sprocket 21 on its axis, will be explained.

As shown in FIG. 4, the supporting shaft 21a of the stationary pinion sprocket 21 is inserted or fitted in the first guide slot 12a of the second stationary disk 12. A guide member 59 is integrally connected to this supporting shaft 21a of the stationary pinion sprocket 21.

The guide member 59 is inserted or fitted in the first guide slot 12a and is guided in the radial direction. The guide member 59 is formed into such shape that the guide member 59 contacts the first guide slot 12a throughout a predetermined length in the radial direction of the second stationary disk 12. Thus, the guide member 59 also serves as a member that, when a rotational force attempting to rotate the stationary pinion sprocket 21 on its axis acts on the stationary pinion sprocket 21, transmits this rotational force to the first guide slot 12a and fixes the stationary pinion sprocket 21 in reaction to the rotational force (i.e. by a drag force). That is, the guide member 59 is formed into such shape that the guide member 59 can slide in the first guide slot 12a in the radial direction and has a rotation-stop function. Here, the predetermined length here is such length that the drag force of the rotational force rotating the stationary pinion sprocket 21 on its axis can be secured.

FIG. 4 shows, as an example, a case where the first guide slot 12a is formed into a rectangular shape having a longitudinal direction in the radial direction, and the guide member 59 is formed into a rectangular shape that is smaller than the rectangular shape of the first guide slot 12a.

Here, if bearings are provided on side walls of the guide member 59 which contact inner walls of the first guide slot 12a, especially on four corners of the guide member 59, a smoother sliding motion of the guide member 59 can be ensured.

Next, a configuration of the mechanical rotation drive mechanism 50, which drives the rotation of the rotation pinion sprockets 22, 23, will be explained.

The mechanical rotation drive mechanism 50 has pinions 51 and 52 that are fixedly connected to the supporting shafts 22a and 23a of the rotation pinion sprockets 22 and 23 so as to rotate integrally with the supporting shafts 22a and 23a and racks 53 and 54 that are formed so as to mesh with the pinions 51 and 52 respectively.

The pinions 51 and 52 are formed at axial direction end portions of the supporting shafts 22a and 23a of the rotation pinion sprockets 22 and 23 respectively. The racks 53 and 54 corresponding to the pinions 51 and 52 are fixed to the second stationary disk 12 along the radial direction.

In the following description, to make a distinction, the pinion (an advanced side pinion) 51 of the first rotation pinion sprocket 22 is called a first pinion 51, and the rack (an advanced side rack) 53 meshed with this first pinion 51 is called a first rack 53. Likewise, the pinion (a retarded side pinion) 52 of the second rotation pinion sprocket 23 is called a second pinion 52, and the rack (a retarded side rack) 54 meshed with this second pinion 52 is called a second rack 54.

As shown in FIG. 4, the first rack 53 is disposed at a retarded side with respect to the first pinion 51 with the revolution direction being a reference direction, while the second rack 54 is disposed at an advanced side with respect to the second pinion 52 with the revolution direction being a reference direction. Therefore, the pinions 51 and 52 and the racks 53 and 54 are configured so that when the pinions 51 and 52 move in a diameter-widening direction or in a diameter-reducing direction, the pinions 51 and 52 rotate in mutually opposite directions by the racks 53 and 54 with which the pinions 51 and 52 mesh.

That is, the mechanical rotation drive mechanism 50 is a mechanism that sets rotation phases of the rotation of the rotation pinion sprockets 22 and 23 on their axes in accordance with a radial direction position of each of the pinion sprockets 20 that are moved by the sprocket movement mechanism 40A. That is to say, by the mechanical rotation drive mechanism 50, the radial direction position of the pinion sprockets 20 and the rotation phases of the rotation of the rotation pinion sprockets 22 and 23 on their axes are in a one-to-one relationship.

In this manner, the mechanical rotation drive mechanism 50 guides the stationary pinion sprocket 21 so that the stationary pinion sprocket 21 does not rotate on its axis, and guides the rotation pinion sprockets 22 and 23 so that the rotation pinion sprockets 22 and 23 rotate on their axes.

Here, except for a difference in position between the racks 53 and 54 with respect to the respective pinions 51 and 52, the first pinion 51 and the second pinion 52 have the same structure, and the first rack 53 and the second rack 54 have the same structure. Thus, in the following description, the first pinion 51 and the first rack 53 are focused here, and their structures of configurations will be explained.

An outside diameter (a pitch circle diameter) of the first pinion 51 is set to be approximately half of an outside diameter (a pitch circle diameter) of the first rotation pinion sprocket 22. Conversely, the outside diameter of the first rotation pinion sprocket 22 is set to be approximately double of the outside diameter of the first pinion 51. This reason will be explained below.

Since the three pinion sprockets 20 are arranged at regular intervals in the circumferential direction, when the first rotation pinion sprocket 22 moves in the radial direction by a distance x, a chain length between the first rotation pinion sprocket 22 and the stationary pinion sprocket 21 changes by "$2\pi x/3$".

Because of this, if the first rotation pinion sprocket 22 rotates (rotates on its axis) so that the chain 6 whose length is "$2\pi x/3$" is fed or sent or pushed out between the first rotation pinion sprocket 22 and the stationary pinion sprocket 21 or is drawn out from a region between the first rotation pinion sprocket 22 and the stationary pinion sprocket 21, the chain length is appropriately adjusted.

Therefore, in order to appropriately adjust the chain length, it is required that when the first pinion 51 rotates by the distance x, the first rotation pinion sprocket 22 should rotate by $2\pi x/3$. That is, it is required that the first rotation pinion sprocket 22 should rotate by $2\pi/3$ times the rotation of the first pinion 51 in a circumferential direction length. In other words, it is necessary that a ratio between the outside diameter of the first rotation pinion sprocket 22 and the outside diameter of the first pinion 51 should be "$2\pi/3:1$".

Accordingly, the outside diameter of the first rotation pinion sprocket 22 is set to be "$2\pi/3$" times (approximately double of) the outside diameter of the first pinion 51.

Here, the first rotation pinion sprocket 22 is provided with a disc spring inserted between the supporting shaft 22a and rotation pins 22b and 22c, although these are not shown in the drawings. The disc spring is provided in order to absorb engagement shock of the first rotation pinion sprocket 22 and the chain 6 which could occur during the transmission ratio change. This disc spring is also provided at the stationary pinion sprocket 21 and the second rotation pinion sprocket 23.

[1-1-1-4. Rotation Shaft]

Next, the rotation shaft 1 will be explained with reference to FIG. 1. In the explanation of the rotation shaft 1, the composite sprocket 5 on the output side is focused, and its configuration will be explained. In FIG. 1, a maximum circumcircle radius on the output side, which is widened by the drive of the relative rotation drive mechanism 30, is shown by a solid line, while a minimum circumcircle radius on the output side, which is reduced by the drive of the relative rotation drive mechanism 30, is shown by a dashed line.

The rotation shaft 1 is provided with a recessed portion 2 that can accommodate therein the plurality of pinion sprockets 20. When the circumcircle radius becomes the minimum diameter, the plurality of pinion sprockets 20 are most deeply accommodated in the recessed portion 2. As a diameter position of the plurality of pinion sprockets 20 moves to an outside (a diameter-widening side) from this state, a degree of accommodation (an accommodation depth) of the plurality of pinion sprockets 20 in the recessed portion 2 becomes smaller. And when the diameter position further moves to the outside, the plurality of pinion sprockets 20 are separated from the recessed portion 2.

The recessed portion 2 has a first recessed portion 2a that corresponds to the stationary pinion sprocket 21 and two second recessed portions 2b and 2b that correspond to the rotation pinion sprockets 22 and 23. One of the two second recessed portions 2b and the other have the same structure.

The first recessed portion 2a has a shape that corresponds to an outer circumferential shape of the stationary pinion sprocket 21. More specifically, the first recessed portion 2a has a cross-sectional shape that corresponds to an outer circumferential shape of the body 21b of the stationary pinion sprocket 21 from an outer peripheral surface side of the cylindrical rotation shaft 1. In this embodiment, since the outer circumferential shape of the body 21b is an arc shape, the first recessed portion 2a has a shape obtained by removing a part of a cylinder, which is thinner than the cylindrical rotation shaft 1, from the cylindrical rotation shaft 1. When the circumcircle radius becomes the minimum diameter, the body 21b of the stationary pinion sprocket 21 contacts the first recessed portion 2a. At this time, the body 21b of the stationary pinion sprocket 21 is accommodated in the rotation shaft 1 so as to be engaged or meshed with the rotation shaft 1.

The second recessed portion 2b has a shape that corresponds to an outer circumferential shape of the rotation pinion sprockets 22 and 23. More specifically, the second recessed portion 2b has a shape obtained by removing a part of a cylinder whose bottom surface or top surface is a circle formed by connecting each tip end of the teeth of the rotation pinion sprockets 22 and 23 from the outer peripheral surface side of the cylindrical rotation shaft 1. When the circumcircle radius becomes the minimum diameter, each tip end of the rotation pinion sprockets 22 and 23 contacts the second recessed portion 2b. At this time, the rotation pinion sprockets 22 and 23 are accommodated in the rotation shaft 1 so as to be engaged or meshed with the rotation shaft 1.

Here, when the circumcircle radius becomes the minimum diameter, each guide rod 29 contacts an outer peripheral surface 1a of the rotation shaft 1 which is located between the recessed portion 2a and 2b.

[1-1-2. Chain]

Next, the chain 6 will be explained with reference to FIG. 5.

The chain 6 guided by the guide rod 29 has chains corresponding to the number of rows of the gear of the pinion sprockets 21, 22 and 23 (here, three rows). In this embodiment, three of chains; a first chain 6A, a second chain 6B and a third chain 6C, are provided.

Figure 5:
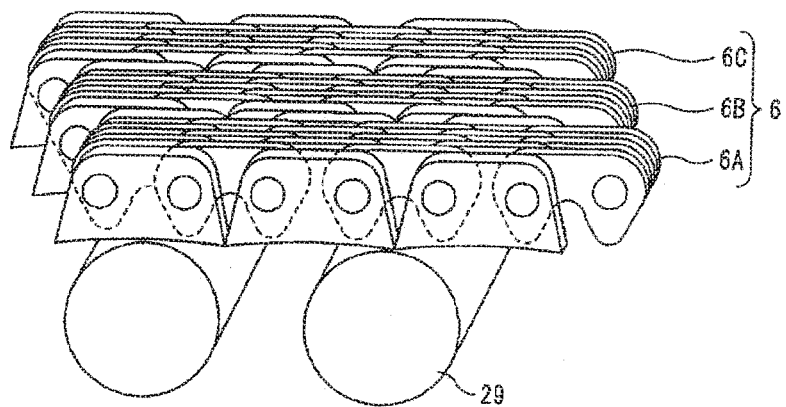
FIG. 5 is a perspective view schematically showing a part of a chain and a part of the guide rod that guides the chain.

Although FIG. 5 shows a case where so-called silent chains are used as the chains 6A, 6B and 6C, instead of the silent chain, other chains such as a roller chain and a bush chain can be used.

These chains 6A, 6B and 6C are arranged with a pitch shifted between them. Here, the chains 6A, 6B and 6C are mutually shifted by ⅓ pitch. A phase of each tooth 20c of the pinion sprockets 20, which is engaged with the respective chains 6A, 6B and 6C, is shifted according to the shift of the pitch.

Except for the setting of the pitch, the chains 6A, 6B and 6C have the same structure or configuration.

Here, two chains or four or more chains could be used depending on the transmission torque of the continuously variable transmission mechanism. In this case, it is desirable that each chain be shifted by "1/the number of chains" pitch.

[1-2. Working and Effect]

The continuously variable transmission mechanism according to the first embodiment of the present invention is configured as described above. Therefore, the following working and effect can be obtained.

When changing the rotation phase of the movable disk 19 with respect to the stationary disk group 10 by the relative rotation drive mechanism 30, the sprocket movement mechanism 40A and the rod movement mechanism 40B are operated, and the radial direction positions of the pinion sprockets 20 and the guide rod 29 with respect to the shaft center C1 of the rotation shaft 1 are changed in synchronization with each other while equidistance of the radial direction positions from the shaft center C1 of the rotation shaft 1 being maintained. With this working, the circumcircle radius is changed. In this case, if the pinion sprockets do not rotate on their axes, the phase shift of the pinion sprockets with respect to the chain occurs. However, this phase shift is eliminated by the rotation of the rotation pinion sprockets 22 and 23 on their axes by the mechanical rotation drive mechanism 50.

In the case where the chain 6 is wound around the stationary pinion sprocket 21 and the first rotation pinion sprocket 22 or the second rotation pinion sprocket 23, when the circumcircle radius is widened, an appropriate chain length between the stationary pinion sprocket 21 and the first rotation pinion sprocket 22 or between the stationary pinion sprocket 21 and the second rotation pinion sprocket 23 becomes long. Then, if the mechanical rotation drive mechanism 50 is not provided, a shortage of the chain length could occur. At this time, by the fact that the first rotation pinion sprocket 22 or the second rotation pinion sprocket 23 is rotated on its axis by the mechanical rotation drive mechanism 50, the chain 6 is fed or sent or pushed out by a length of the chain length shortage between the stationary pinion sprocket 21 and the first rotation pinion sprocket 22 or between the stationary pinion sprocket 21 and the second rotation pinion sprocket 23.

On the other hand, in the case where the chain 6 is wound around the stationary pinion sprocket 21 and the first rotation pinion sprocket 22 or the second rotation pinion sprocket 23, when the circumcircle radius is reduced, the appropriate chain length between the stationary pinion sprocket 21 and the first rotation pinion sprocket 22 or between the stationary pinion sprocket 21 and the second rotation pinion sprocket 23 becomes short. Then, if the mechanical rotation drive mechanism 50 is not provided, the slack of the chain could occur. At this time, by the fact that the first rotation pinion sprocket 22 or the second rotation pinion sprocket 23 is rotated on its axis by the mechanical rotation drive mechanism 50, the chain 6 is drawn out by an extra or a redundant chain length (by a length of the slack of the chain) from a region between the stationary pinion sprocket 21 and the first rotation pinion sprocket 22 or between the stationary pinion sprocket 21 and the second rotation pinion sprocket 23.

With regard to the rotation pinion sprockets 22 and 23 that rotate on their axes when the circumcircle radius is widened and reduced, by the mechanical rotation drive mechanism 50, the radial direction position of the pinion sprockets 20 and the rotation phases of the rotation of the rotation pinion sprockets 22 and 23 on their axes are in the one-to-one relationship. That is, the rotation pinion sprockets 22 and 23 can transmit the power while adjusting excess and deficiency (redundancy and shortage) of the length of the chain 6 during change of the transmission ratio by the widening or reduction of the circumcircle radius.

In this manner, the mechanical rotation drive mechanism 50 drives the rotation of the rotation pinion sprockets 22, 23 in concert with the sprocket movement mechanism 40A so as to eliminate the phase shift of the plurality of pinion sprockets 20 with respect to the chain 6, by or associated with the radial direction movement of the plurality of pinion sprockets 20 by the sprocket movement mechanism 40A. Therefore, the chain length between the pinion sprockets is appropriately adjusted during the radial direction movement of the plurality of pinion sprockets 20, namely during the transmission ratio change, thereby changing the transmission ratio while transmitting the power.

More specifically, when the plurality of pinion sprockets 20 move in the radial direction, i.e. when the transmission ratio is changed, the pinions 51 and 52 rotate while meshing with the racks 53 and 54. By these rotation, the rotation pinion sprockets 22 and 23 are driven and rotated on their axes. Since this drive of the rotation is performed in concert with the sprocket movement mechanism 40A so as to eliminate the phase shift between the plurality of pinion sprockets 20 with respect to the chain 6, the chain length between the plurality of pinion sprockets 20 is appropriately adjusted. At this time, since the pinions 51 and 52 mesh with the racks 53 and 54 respectively, the pinions 51 and 52 and the rotation pinion sprockets 22 and 23 rotating integrally with the pinions 51 and 52 do not rotate freely. It is therefore possible to change the transmission ratio while transmitting the power. Further, in a case where the continuously variable transmission mechanism of the present invention is used as a transmission for a vehicle mounting an engine, engine brake becomes effective.

More specifically about the configuration, the first rack 53 is disposed at the retarded side with respect to the first pinion 51 of the first rotation pinion sprocket 22, while the second rack 54 is disposed at the advanced side with respect to the second pinion 52 of the second rotation pinion sprocket 23. Therefore, when the circumcircle radius is widened, the chain 6 is fed or sent or pushed out by the length of the chain length shortage between the stationary pinion sprocket 21 and the first rotation pinion sprocket 22 or between the stationary pinion sprocket 21 and the second rotation pinion sprocket 23. Further, when the circumcircle radius is reduced, the chain 6 is drawn out by the extra or redundant chain length (by the length of the slack of the chain) from the region between the stationary pinion sprocket 21 and the first rotation pinion sprocket 22 or between the stationary pinion sprocket 21 and the second rotation pinion sprocket 23. That is, the chain 6 that tends to be slack is drawn out, while the chain 6 that tends to tighten is fed or sent or pushed out. It is thus possible to appropriately adjust the chain length.

Since the plurality of pinion sprockets 20, i.e. the three pinion sprockets 20, are arranged at regular intervals, even if the plurality of pinion sprockets 20 are positioned in any rotation phases, the power transmission between the chain 6 and any of the pinion sprockets 20 is not interrupted. This therefore contributes to a reliable power transmission.

Further, since the outer circumferences of the rotation pinion sprockets 22 and 23 are set to be approximately double of the circumferences of the pinions 51 and 52, the chain 6 is fed or sent or pushed out between the pinion sprockets 20 or is drawn out from the region between the pinion sprockets 20, then the chain length can be appropriately adjusted without excess and deficiency (redundancy and shortage) of the length of the chain 6.

The guide member 59 integrally connected to the supporting shaft 21a of the stationary pinion sprocket 21 is formed into such shape that the guide member 59 contacts the first guide slot 12a throughout the predetermined length in the radial direction of the first guide slot 12a. Thus, even if the rotational force attempting to rotate the stationary pinion sprocket 21 on its axis acts on the stationary pinion sprocket 21, the guide member 59 contacts the first guide slot 12a by the rotational force, then the guide member 59 does not rotate on its axis. Therefore, the rotation of the stationary pinion sprocket 21 on its axis can be prohibited.

Since the rotation of the stationary pinion sprocket 21 on its axis is prohibited, the chain length, whose excess and deficiency (redundancy and shortage) occur between the stationary pinion sprocket 21 and each of the rotation pinion sprockets 22 and 23 when the transmission ratio is changed, becomes constant according to each radial direction movement distance of the pinion sprockets 21, 22 and 23, then this contributes to the adjustment of the chain length.

When the movable disk 19 is driven and relatively rotated with respect to the first stationary disk 11 by the relative rotation drive mechanism 30 in the sprocket movement mechanism 40A, the intersection point of the sprocket stationary radial slot 11a of the first stationary disk 11 and the sprocket movable radial slot 19a of the movable disk 19 moves in the radial direction, and the supporting shafts 21a, 22a and 23a of each intersection point and the pinion sprockets 21, 22 and 23 supported by these supporting shafts 21a, 22a and 23a move in the radial direction. In this manner, the three pinion sprockets 20 can be moved in the radial direction in synchronization with each other while equidistance of the three pinion sprockets 20 from the shaft center C1 of the rotation shaft 1 being maintained, and the transmission ratio can be changed.

Since the recessed portion 2 that can accommodate the plurality of pinion sprockets 20 is formed at the outer periphery of the rotation shaft 1 and the plurality of pinion sprockets 20 are accommodated in the recessed portion 2 so as to be engaged or meshed with the recessed portion 2, it is possible to bring each position of the plurality of pinion sprockets 20 closer to the shaft center C1 of the rotation shaft 1. With this configuration, the minimum diameter of the circumcircle radius that is formed by the plurality of pinion sprockets 20 can be small. Therefore, a ratio coverage can be increased.

Since the plurality of pinion sprockets 20 contact the rotation shaft 1 when the circumcircle radius becomes the minimum diameter, a cross-sectional area of the rotation shaft 1 is secured, thereby securing rigidity and strength of the rotation shaft 1. In addition, although there is a possibility that heavy load will be imposed on the rotation shaft 1 when the circumcircle radius becomes the minimum diameter, since the rigidity and the strength of the rotation shaft 1 are secured, durability of the continuously variable transmission mechanism is ensured and reliability of the continuously variable transmission mechanism is improved.

Moreover, since the plurality of guide rods 29 contact the outer peripheral surface 1a of the rotation shaft 1 when the circumcircle radius becomes the minimum diameter, it is possible to suppress deformation of the guide rod 29 such as bending, flexure and twist. With this, variation in distance between the chain 6 and the shaft center C1 of the rotation shaft 1 is suppressed, and this contributes to reduction of vibration and noise. Further, since the cross-sectional area of the rotation shaft 1 is secured, the strength of the rotation shaft 1 can be secured.

The first recessed portion 2a corresponding to the outer circumferential shape of the stationary pinion sprocket 21 provided at apart of the outer circumferential area thereof with the protruding teeth 21c is formed at the outer periphery of the rotation shaft 1, and also the second recessed portion 2b corresponding to the outer circumferential shape of the rotation pinion sprockets 22 and 23 provided at an entire circumference of the circumferential portion thereof with the teeth is formed at the outer periphery of the rotation shaft 1. Thus, the first recessed portion 2a is smaller than the second recessed portion 2b. Therefore, as compared with a case where the second recessed portion 2b is formed instead of the first recessed portion 2a, the cross-sectional area of the rotation shaft 1 can be secured.

Furthermore, the minimum diameter of the circumcircle radius can be smaller while securing the same cross-sectional area of the rotation shaft 1 as that of the case where the second recessed portion 2b is formed instead of the first recessed portion 2a. With this, the coverage can be further increased.

In addition, the chains 6A, 6B and 6C are arranged with the pitch shifted between them. As a consequence, noise caused by contact between the chains 6A, 6B and 6C and the guide rod 29 is dispersed, then the noise can be reduced.

2. Second Embodiment

In the following description, the continuously variable transmission mechanism of a second embodiment will be explained.

[2-1. Configuration]

A difference from the above first embodiment is a configuration of the mechanical rotation drive mechanism. Therefore, this difference will be explained here.

In the explanation, the same element or component as that of the first embodiment is denoted by the same reference sign, and its explanation will be omitted.

[2-1-1. Stationary Disk]

In the present embodiment, the stationary disk group 10 has, in order from a side of the plurality of pinion sprockets 20, a first stationary disk (a stationary disk) 11, a second stationary disk (a first rotation disk) 112 and a third stationary disk (a second rotation disk) 13. Each of these stationary disks 11, 112 and 13 is formed integrally with the rotation shaft 1, or each of these stationary disks 11, 112 and 13 is connected to the rotation shaft 1 so as to rotate integrally with the rotation shaft 1.

A first rotation radial slot (or groove) 112a is formed at the second stationary disk 112, and a second rotation radial slot (or groove) 13a is formed at the third stationary disk 13.

Each of the rotation radial slots 112a and 13a serves as a guide slot of rotation pins 22b, 22c, 23b and 23c.

At least either of the second stationary disk 112 or the third stationary disk 13 is provided with a pin slot (or groove) to guide a pin that is formed at the stationary pinion sprocket 21, although these are not shown in the drawings. This pin slot is formed so as to extend along a moving route in the radial direction of the stationary pinion sprocket 21. The pin slot guides the stationary pinion sprocket 21 so as to prohibit the rotation of the stationary pinion sprocket 21 on its axis without interfering with the radial direction movement of the stationary pinion sprocket 21.

Configuration and function of the stationary disk 11 and the movable disk 19 are the same as those of the first embodiment.

[2-1-2. Pinion Sprocket]

In the same manner as the first embodiment, the first rotation pinion sprocket 22 rotates on its axis in the clockwise direction when the circumcircle radius is widened, while the first rotation pinion sprocket 22 rotates on its axis in the counterclockwise direction when the circumcircle radius is reduced. On the other hand, the second rotation pinion sprocket 23 rotates on its axis in the counterclockwise direction when the circumcircle radius is widened, while the second rotation pinion sprocket 23 rotates on its axis in the clockwise direction when the circumcircle radius is reduced.

Figure 6:
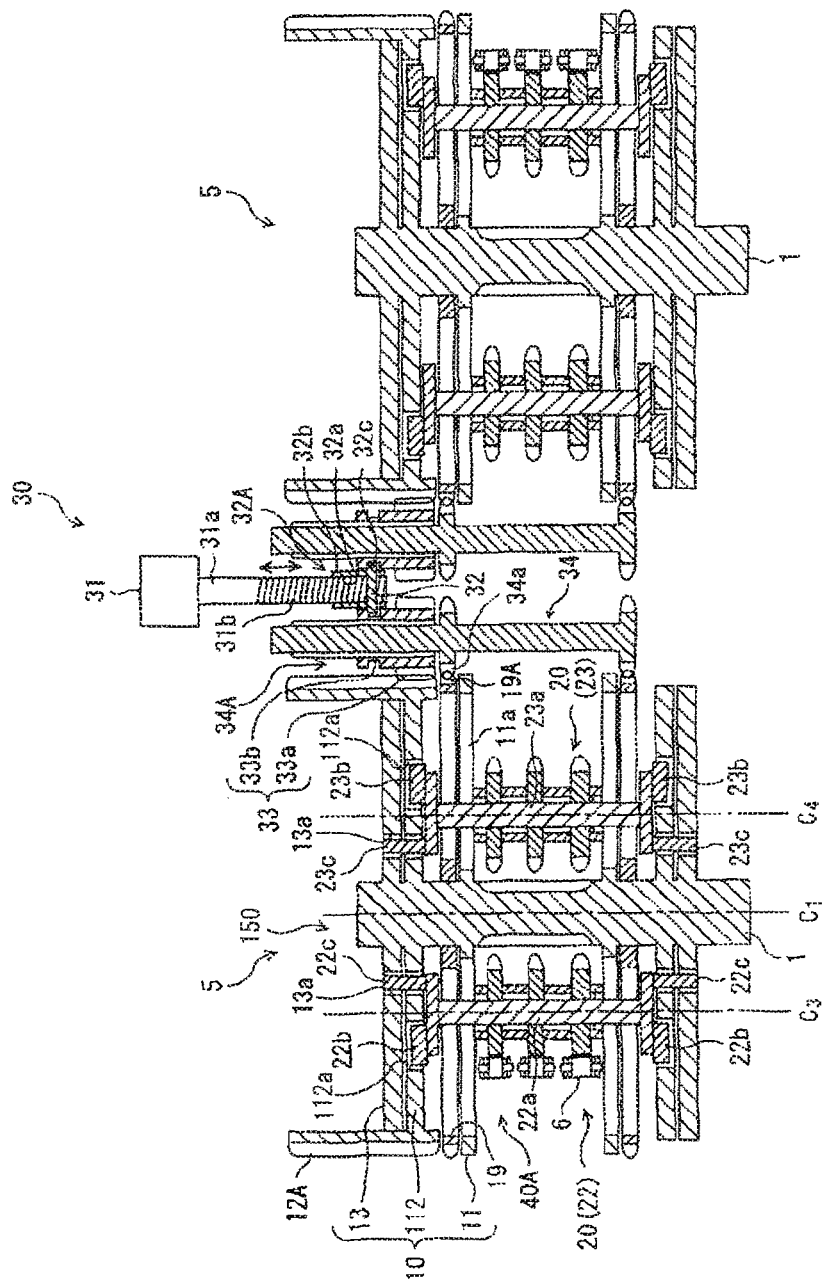
FIG. 6 is a sectional view schematically showing a main part of a continuously variable transmission mechanism according to a second embodiment of the present invention.
Figure 7:
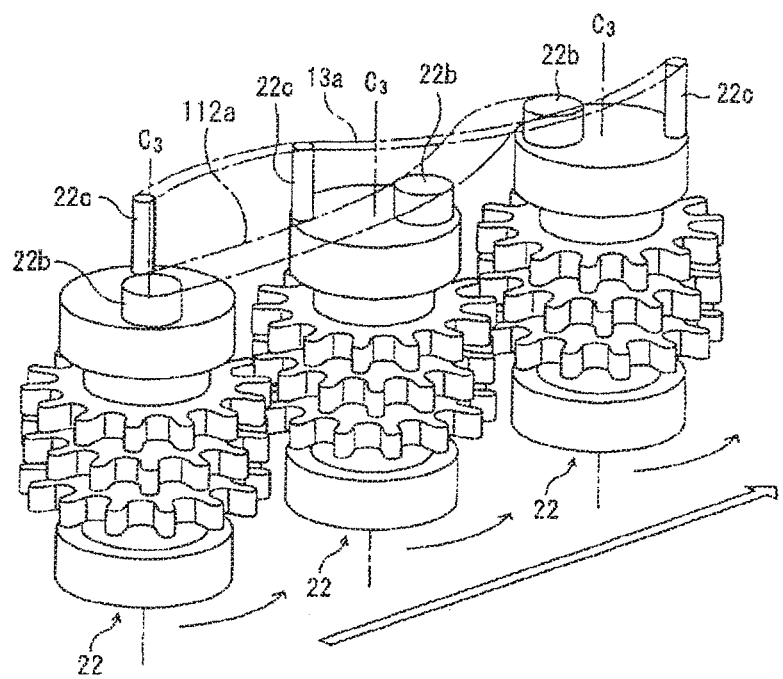
FIG. 7 is a perspective view showing a pinion sprocket of the continuously variable transmission mechanism according to the second embodiment.
Figures 8A, 8B, 8C:
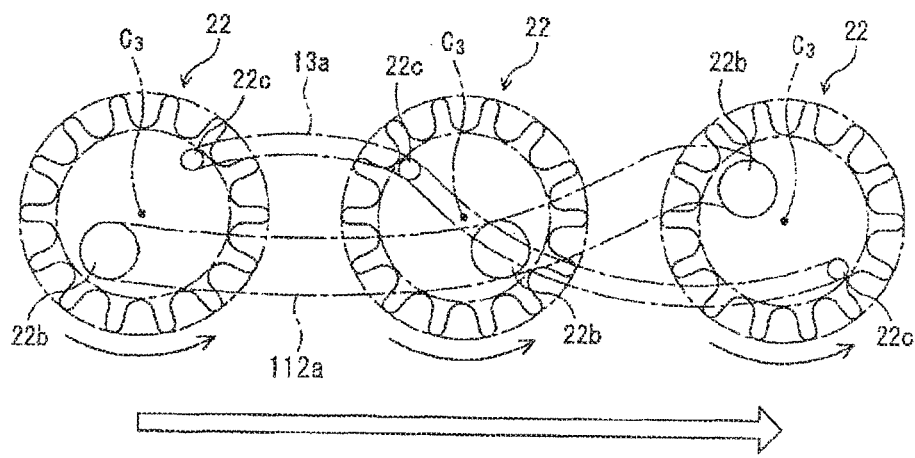
FIGS. 8A to 8C are top views of FIG. 7, which are shown in order of FIG. 8A, FIG. 8B and FIG. 8C along the time series.

As shown in FIG. 6, the first rotation pinion sprocket 22 is provided with the first rotation pin 22b and the second rotation pin 22c, each of which protrudes from the first rotation pinion sprocket 22, for drive of the rotation of the first rotation pinion sprocket 22 by a mechanical rotation drive mechanism 150. These rotation pins 22b and 22c are provided eccentrically to the shaft center C3 of the supporting shaft 22a. In FIG. 6, in the same manner as FIG. 2, for easy understanding, the configuration is schematically shown, and the first rotation pinion sprocket 22 and the second rotation pinion sprocket 23 are shown on a same cross section.

Likewise, the second rotation pinion sprocket 23 is provided with the first rotation pin 23b and the second rotation pin 23c, each of which protrudes from the second rotation pinion sprocket 23, for drive of the rotation of the second rotation pinion sprocket 23 by the mechanical rotation drive mechanism 150. These rotation pins 23b and 23c are provided eccentrically to the shaft center C4 of the supporting shaft 23a.

Here, lengths along the shaft centers C3 and C4 of the second rotation pins 22c and 23c are set to be longer than those of the first rotation pins 22b and 23b by a length that is greater than a thickness of the second stationary disk 112. Then, the second rotation pins 22c and 23c are inserted or fitted in the second rotation radial slot 13a of the third stationary disk 13, and guided by the second rotation radial slot 13a.

Further, the stationary pinion sprocket 21 is also provided with the pin that protrudes from the stationary pinion sprocket 21, although the pin is not shown in the drawings. This pin is provided eccentrically to the shaft center C2. The pin serves as a rotation stopper that prohibits the rotation of the stationary pinion sprocket 21 on its axis by being guided by the pin slot that is formed at at least either of the second stationary disk 112 or the third stationary disk 13.

[2-1-3. Mechanical Rotation Drive Mechanism]

As shown in FIG. 6, the mechanical rotation drive mechanism 150 is formed from the rotation pins 22b, 22c, 23b and 23c provided at the supporting shafts 22a and 23a of the rotation pinion sprockets 22 and 23, the first rotation radial slot 112a formed at the second stationary disk 112 and the second rotation radial slot 13a formed at the third stationary disk 13. Further, the mechanical rotation drive mechanism 150 has the pin (not shown) provided at the supporting shaft 21a of the stationary pinion sprocket 21 and at least either of the second stationary disk 112 or the third stationary disk 13 at which the pin slot to guide the pin so as to prohibit the rotation of the stationary pinion sprocket 21 on its axis is formed.

Here, although the rotation directions of the first rotation pinion sprocket 22 and the second rotation pinion sprocket 23 on their axes by the mechanical rotation drive mechanism 150 are different from each other, the first rotation pinion sprocket 22 and the second rotation pinion sprocket 23 rotate in the same way. Therefore, the first rotation pinion sprocket 22 is focused here, and configuration of the mechanical rotation drive mechanism 150 will be explained.

As shown in FIGS. 7 and 8A to 8C, the mechanical rotation drive mechanism 150 guides the rotation pins 22b and 22c provided eccentrically to the shaft center C3 by the corresponding rotation radial slots 112a and 13a, then rotates the first rotation pinion sprocket 22 on its axis. In FIGS. 7 and 8A to 8C, time series are shown in order indicated by an open arrow.

Each of the rotation radial slots 112a and 13a is formed into such shape that the rotation pinion sprockets 22 and 23 rotate so as to eliminate the phase shift, by or associated with the radial direction movement of the pinion sprockets 20, of the pinion sprockets 20 with respect to the chain 6.

In addition, the mechanical rotation drive mechanism 150 guides the pin of the stationary pinion sprocket 21 by the pin slot extending along the moving route of the stationary pinion sprocket 21, and thus the pin of the stationary pinion sprocket 21 contacts an inside of this pin slot, which is not shown in the drawings. The mechanical rotation drive mechanism 150 therefore prohibits the rotation of the stationary pinion sprocket 21 on its axis without interfering with the radial direction movement of the stationary pinion sprocket 21.

[2-2. Working and Effect]

According to the configuration of the second embodiment, the mechanical rotation drive mechanism 150 drives the rotation of the rotation pinion sprockets 22, 23 in concert with the sprocket movement mechanism 40A so as to eliminate the phase shift of the plurality of pinion sprockets 20 with respect to the chain 6, by or associated with the radial direction movement of the plurality of pinion sprockets 20 by the sprocket movement mechanism 40A. Therefore, in the same manner as the first embodiment, the chain length between the pinion sprockets is appropriately adjusted during the radial direction movement of the plurality of pinion sprockets 20, namely during the transmission ratio change, thereby changing the transmission ratio while transmitting the power.

More specifically, when the plurality of pinion sprockets 20 move in the radial direction, i.e. when the transmission ratio is changed, the mechanical rotation drive mechanism 150 rotates the rotation pinion sprockets 22, 23 on their axes by guiding the rotation pins 22b and 22c by the rotation radial slots 112a and 13a. Thus, the chain length between the plurality of pinion sprockets 20 is appropriately adjusted. It is therefore possible to change the transmission ratio smoothly while surely transmitting the power. Further, in a case where the continuously variable transmission mechanism of the present invention is used as a transmission for a vehicle mounting an engine, engine brake becomes effective.

In particular, the mechanical rotation drive mechanism 150 has, as two types of the rotation pin provided eccentrically to the shaft centers C3, C4 of the rotation pinion sprockets 22, 23, the first rotation pins 22b and 23b and the second rotation pins 22c and 23c, and also has, as two types of the rotation radial slot corresponding to these rotation pins 22b, 22c, 23b and 23c, the first rotation radial slot 112a and the second rotation radial slot 13a. It is therefore possible to surely rotate the rotation pinion sprockets 22, 23 on their axes, and this ensures the transmission ratio change and contributes increase in power transmission efficiency.

Moreover, the mechanical rotation drive mechanism 150 guides the stationary pinion sprocket 21 so that the stationary pinion sprocket 21 does not rotate on its axis, and guides the rotation pinion sprockets 22 and 23 so that the rotation pinion sprockets 22 and 23 rotate on their axes. Therefore, the excess and deficiency (redundancy and shortage) of the length of the chain between the stationary pinion sprocket 21 and the rotation pinion sprockets 22, 23 that are the pinion sprockets adjacent to the stationary pinion sprocket 21 can be adjusted. It is thus possible to change the transmission ratio while surely transmitting the power.

Other working and effect by the second embodiment can be obtained in the same manner as the first embodiment.

3. Others

Although the present invention has been explained on the basis of the embodiments above, the present invention is not limited to the embodiments described above. Configuration or structure in the above embodiments includes all design modifications and equivalents belonging to the technical scope of the present invention. Each configuration or structure in the above embodiments can be omitted, selected and combined, as necessary.

Each embodiment shows the stationary pinion sprocket 21 that does not rotate on its axis and the rotation pinion sprockets 22 and 23 that rotate on their axes. However, configuration in which all the pinion sprockets 21, 22 and 23 rotate on their axes is possible. In this case, the rotation directions of at least a pair of adjacent pinion sprockets on their axes are set to be opposite to each other.

Further, although each embodiment shows the three pinion sprockets 20, the number of the pinion sprockets is not limited to three. It could be four or more. Also, as long as any pinion sprocket 20 is engaged with the chain 6 all the time, the number of the pinion sprockets might be two. In any case, at least either of the adjacent pinion sprockets 20 is the pinion sprocket 20 that rotates on its axis, and the radial slots 11a and 19a corresponding to the number of the pinion sprocket 20 are provided.

Furthermore, the place where the helical gear 12A is provided is not limited to the outer circumferential portion of the second stationary disk 12. The helical gear 12A could be provided at at least any portion of the stationary disk group 10. In this case, a position of the helical gear 33a, engaged with the helical gear 12A, of the relative rotation drive mechanism 30 is changed.

Moreover, a recessed portion that can accommodate therein the guide rod 29 could be provided at the rotation shaft 1. In this case, it is preferable that the guide rod 29 contact the rotation shaft 1 when the circumcircle radius becomes the minimum diameter. In this case, a cross-sectional area of the rotation shaft 1 is further secured, and rigidity and strength of the rotation shaft 1 can be increased.

On the other hand, the recessed portion 2 could be provided in at least one position of the rotation shaft 1 for at least one of the plurality of pinion sprockets 20. Further, the pinion sprocket 20 and the guide rod 29 could be configured so that all or a part of the pinion sprocket 20 or all or a part of the guide rod 29 does not contact the rotation shaft 1 when the circumcircle radius becomes the minimum diameter.

The first embodiment shows, as an example, the case where the first stationary disk 11, the movable disk 19 and the second stationary disk 12 are arranged in order from the side of the plurality of pinion sprockets 20. However, the arrangement of the disk is not limited to this. The movable disk 19, the first stationary disk 11 and the second stationary disk 12 could be arranged in order from the side of the plurality of pinion sprockets 20. Further, the first stationary disk 11 and the second stationary disk 12 could be formed integrally with each other. That is, the first stationary disk 11 can also serve as the second stationary disk 12. In this case, the stationary disk used as the second stationary disk 12 is provided with the sprocket stationary radial slot 11a and the rod stationary radial slot 11b, and the racks 53 and 54 are fixed to this stationary disk. In this configuration, the sprocket stationary radial slot 11a also serves as the guide slot that guides the supporting shafts 21a, 22a and 23a of the pinion sprockets 21, 22 and 23. According to this configuration, as compared with the case where the first stationary disk 11 and the second stationary disk 12 are each provided, the configuration can be simplified. This leads to suppression of cost, and also can reduce the weight of the continuously variable transmission mechanism.

Additionally, the second embodiment shows the case where the two rotation pins 22b and 22c and the two rotation pins 23b and 23c are provided at both end portions of the supporting shafts 22a and 23a of the pinion sprockets 22 and 23. However, the rotation pins 22b and 22c and the rotation pins 23b and 23c could be provided at only one end or the other end of the supporting shafts 22a and 23a. Further, only the first rotation pins 22b and 23b or only the second rotation pins 22c and 23c might be provided. In this case, the rotation radial slot corresponding to the provided rotation pin is set. With this setting, the configuration can be simplified.

The invention claimed is:

1. A continuously variable transmission mechanism that changes a transmission ratio, comprising:
   a set of two composite sprockets each having:
      a rotation shaft that inputs or outputs power;
      a plurality of pinion sprockets, each of which is supported movably in a radial direction with respect to the rotation shaft; and
      a sprocket movement mechanism that moves the plurality of pinion sprockets in the radial direction in synchronization with each other while maintaining equidistance of each of the pinion sprockets from a shaft center of the rotation shaft;
   a chain wound around the set of two composite sprockets, the transmission ratio being changed by changing a circumcircle radius that is a radius of a circle that encircles all of the plurality of pinion sprockets and circumscribes all of the plurality of pinion sprockets; and
   a mechanical rotation drive mechanism mechanically driving rotation of at least one rotation pinion sprocket on its axis from among the plurality of pinion sprockets in concert with the sprocket movement mechanism so as to eliminate a phase shift, associated with the radial direction movement of the plurality of pinion sprockets by the sprocket movement mechanism, of the plurality of pinion sprockets with respect to the chain.

2. The continuously variable transmission mechanism as claimed in claim 1, wherein:

the mechanical rotation drive mechanism has a rack arranged along a radial direction of a rotation stationary disk that rotates integrally with the rotation shaft; and a pinion fixedly connected to a supporting shaft of the rotation pinion sprocket and meshing with the rack, and the mechanical rotation drive mechanism rotates the rotation pinion sprocket on its axis by rotation of the pinion meshing with the rack according to the radial direction movement of the rotation pinion sprocket.

3. The continuously variable transmission mechanism as claimed in claim 2, wherein:

the plurality of pinion sprockets include at least one stationary pinion sprocket that does not rotate on its axis, the rotation pinion sprocket has an advanced side rotation pinion sprocket arranged at an advanced side with respect to the stationary pinion sprocket with a revolution direction of the plurality of pinion sprockets being a reference direction; and a retarded side rotation pinion sprocket arranged at a retarded side with respect to the stationary pinion sprocket with the revolution direction of the plurality of pinion sprockets being the reference direction, the rack has an advanced side rack meshing with the pinion of the advanced side rotation pinion sprocket; and a retarded side rack meshing with the pinion of the retarded side rotation pinion sprocket, the advanced side rack is disposed at a retarded side with respect to the pinion of the advanced side rotation pinion sprocket, and the retarded side rack is disposed at an advanced side with respect to the pinion of the retarded side rotation pinion sprocket.

4. The continuously variable transmission mechanism as claimed in claim 3, wherein:

the plurality of pinion sprockets are configured so that three of the stationary pinion sprocket, the advanced side rotation pinion sprocket and the retarded side rotation pinion sprocket are arranged at regular intervals along a circumferential direction, and an outer circumferential length of the rotation pinion sprocket is set to be approximately double of that of the pinion.

5. The continuously variable transmission mechanism as claimed in claim 4, wherein:

the rotation stationary disk has a stationary pinion sprocket guide slot that guides the stationary pinion sprocket, a guide member fitted in and guided by the stationary pinion sprocket guide slot is integrally connected to a supporting shaft of the stationary pinion sprocket, and the guide member is formed into such shape that the guide member contacts the stationary pinion sprocket guide slot throughout a predetermined length in the radial direction of the rotation stationary disk.

6. The continuously variable transmission mechanism as claimed in claim 2, wherein:

the sprocket movement mechanism has a sprocket supporting shaft that supports the pinion sprocket;

a stationary disk that is provided with a sprocket stationary radial slot, in which the sprocket supporting shaft is fitted, and rotates integrally with the rotation shaft;

a movable disk that is disposed concentrically with the stationary disk, can rotate relatively to the stationary disk and is provided with a sprocket movable radial slot that intersects the sprocket stationary radial slot, the sprocket supporting shaft being positioned in an intersection position between the sprocket movable radial slot and the sprocket stationary radial slot; and a drive mechanism that drives relative rotation of the movable disk with respect to the stationary disk and moves the intersection position in the radial direction.

7. The continuously variable transmission mechanism as claimed in claim 6, wherein:

the stationary disk also serves as the rotation stationary disk.

8. The continuously variable transmission mechanism as claimed in claim 1, wherein:

the sprocket movement mechanism has a sprocket supporting shaft that supports the pinion sprocket;

a stationary disk that is provided with a sprocket stationary radial slot, in which the sprocket supporting shaft is fitted, and rotates integrally with the rotation shaft;

a movable disk that is disposed concentrically with the stationary disk, can rotate relatively to the stationary disk and is provided with a sprocket movable radial slot that intersects the sprocket stationary radial slot, the sprocket supporting shaft being positioned in an intersection position between the sprocket movable radial slot and the sprocket stationary radial slot; and a drive mechanism that drives relative rotation of the movable disk with respect to the stationary disk and moves the intersection position in the radial direction, the mechanical rotation drive mechanism has a first rotation pin that is provided eccentrically to the sprocket supporting shaft; and a first rotation disk that is disposed concentrically with the stationary disk, rotates integrally with the rotation shaft and is provided with a first rotation radial slot in which the first rotation pin is fitted, and the first rotation radial slot guides the first rotation pin in concert with a radial direction movement of the sprocket supporting shaft, and rotates the rotation pinion sprocket on its axis.

9. The continuously variable transmission mechanism as claimed in claim 8, wherein:

the mechanical rotation drive mechanism has a second rotation pin that is provided eccentrically to the sprocket supporting shaft; and a second rotation disk that is disposed concentrically with the stationary disk, rotates integrally with the rotation shaft and is provided with a second rotation radial slot in which the second rotation pin is fitted, and the second rotation radial slot guides the second rotation pin in concert with the radial direction movement of the sprocket supporting shaft, and rotates the rotation pinion sprocket on its axis.

10. The continuously variable transmission mechanism as claimed in claim 8, wherein:

the plurality of pinion sprockets include one stationary pinion sprocket that does not rotate on its axis and the rotation pinion sprocket that can rotate on its axis, and the mechanical rotation drive mechanism guides the stationary pinion sprocket so that the stationary pinion sprocket does not rotate on its axis, and guides the rotation pinion sprocket so that the rotation pinion sprocket rotates on its axis.

11. The continuously variable transmission mechanism as claimed in claim 10, wherein:

at least three pinion sprockets are provided at regular intervals along a revolution direction of the pinion sprockets.

* * * * *